(12) United States Patent
Inoue

(10) Patent No.: US 8,050,197 B2
(45) Date of Patent: Nov. 1, 2011

(54) CONNECTION CONTROLLER, COMMUNICATION SYSTEM, AND CONNECTION CONTROL METHOD

(75) Inventor: Akihiro Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 1496 days.

(21) Appl. No.: 11/362,083

(22) Filed: Feb. 27, 2006

(65) Prior Publication Data
US 2006/0192849 A1    Aug. 31, 2006

(30) Foreign Application Priority Data

Feb. 28, 2005  (JP) ................................ 2005-053373

(51) Int. Cl.
 *H04L 12/16*  (2006.01)
 *H04W 4/00*  (2009.01)
 *H04B 7/216*  (2006.01)
(52) U.S. Cl. ......... 370/260; 370/328; 370/335; 370/342
(58) Field of Classification Search .................. None
See application file for complete search history.

(56) References Cited

U.S. PATENT DOCUMENTS
5,771,065 A    6/1998  Hijikata et al.

FOREIGN PATENT DOCUMENTS
JP    5-327914    12/1993
JP    11-136368    5/1999

*Primary Examiner* — Melanie Jagannathan
(74) *Attorney, Agent, or Firm* — Oblon, Spivak, McClelland, Maier & Neustadt, L.L.P.

(57) ABSTRACT

A connection controller for controlling connection with a partner terminal with which communication is performed via a predetermined communication service includes setting information storage means for storing a record of setting information for the connection with the partner terminal, interruption processing means for temporarily stopping communication with a first terminal in the process of the communication with the first terminal and for starting communication with a second terminal, recovery processing means for restarting the communication with the first terminal on the basis of information stored in the setting information storage means when the interrupting communication with the second terminal terminates, terminal detection means for detecting a third terminal, and transfer processing means for starting communication between the third terminal detected by the terminal detection means and a terminal designated by the first terminal and disconnecting the communication with the first terminal in the process of the interrupting communication.

11 Claims, 11 Drawing Sheets

CONNECTION CONTROLLER, COMMUNICATION SYSTEM, AND CONNECTION CONTROL METHOD

CROSS REFERENCES TO RELATED APPLICATIONS

The present invention contains subject matter related to Japanese Patent Application JP 2005-053373 filed in the Japanese Patent Office on Feb. 28, 2005, the entire contents of which are incorporated herein by reference.

BACKGROUND OF THE INVENTION

1. Field of the Invention

The present invention relates to a connection controller that controls connection with a terminal with which communication is performed via a predetermined communication service, a communication system including the connection controller, and a connection control method, and more particularly, to a connection controller, a communication system, and a connection control method in which the convenience of a user of original communication is enhanced when communication interruption occurs.

2. Description of the Related Art

In recent years, due to the great development in communication technologies, transmission and reception of audio and image signals via networks has been generalized. Accordingly, communication services using images and sound, such as videophone services and teleconferencing services, become popular.

In actual videophone or teleconferencing services, in the process of communication using terminals, a user of a terminal may communicate and have a conversation with a party with which the user is not currently communicating or may receive a connection request from the party. Under such circumstances, a videophone terminal that enhances serviceability is available (see, for example, Japanese Unexamined Patent Application Publication No. 5-327914 (paragraphs [0011]-[0015] and FIG. 1)). For example, in the process of communication with a second videophone terminal, when receiving a call from a third videophone terminal, this videophone terminal receives from the third videophone terminal an information image indicating the call reception, combines the received information image with an image received from the second videophone terminal, and displays the combined image. In addition, a teleconferencing system in which, in the process of a teleconferencing service, a teleconference terminal is capable of receiving an interruption report via a circuit for reporting interruption, the circuit being provided independent of a teleconference circuit, is available (see, for example, Japanese Unexamined Patent Application Publication No. 11-136368 paragraphs [0021]-[0023] and FIG. 2).

SUMMARY OF THE INVENTION

As described above, for example, interruption of communication using teleconference terminals by communication with a party with which a user of a terminal is not currently communicating may often be required. In an actual conference, however, restarting communication with an original party with which the user communicated before the interruption is often desired in the process of interrupting communication or after the interrupting communication terminates. However, for such cases, no procedure has been suggested for improving user-friedless so as to be able to communicate with the original party, such as recovery of communication with the original party by a simple operation.

It is desirable to provide a connection controller capable of enhancing the convenience of a user of communication when the communication is interrupted.

It is also desirable to provide a communication system capable of enhancing the convenience of a user of communication when the communication using a terminal is interrupted.

In addition, it is desirable to provide a connection control method capable of enhancing the convenience of a user of communication when the communication is interrupted.

A connection controller according to an embodiment of the present invention for controlling connection with a partner terminal with which communication is performed via a predetermined communication service includes setting information storage means for storing a record of setting information for the connection with the partner terminal with which the communication is performed, interruption processing means for temporarily stopping communication with a first terminal in the process of the communication with the first terminal and for starting communication with a second terminal, recovery processing means for restarting the communication with the first terminal on the basis of information stored in the setting information storage means when the interrupting communication with the second terminal terminates, terminal detection means for detecting a third terminal, and transfer processing means for starting communication between the third terminal detected by the terminal detection means and a terminal designated by the first terminal and disconnecting the communication with the first terminal in the process of the interrupting communication with the second terminal.

In such a connection controller, the setting information storage means stores a record of setting information for connection with a partner terminal with which communication is performed, and the interruption processing means temporarily stops communication with a first terminal in the process of the communication with the first terminal and starts communication with a second terminal. When the interrupting communication with the second terminal terminates, the recovery processing means restarts the communication with the first terminal on the basis of information stored in the setting information storage means. When the interrupting communication with the second terminal is maintained, the transfer processing means starts communication between a third terminal detected by the terminal detection means and a terminal designated by the first terminal and disconnects the communication with the first terminal, and communication using the third terminal can be performed.

A connection control method according to an embodiment of the present invention for controlling connection with a partner terminal with which communication is performed via a predetermined communication service includes the steps of storing, by setting information storage means, a record of setting information for the connection with the partner terminal with which the communication is performed; temporarily stopping, by interruption processing means, communication with a first terminal in the process of the communication with the first terminal and starting communication with a second terminal; restarting, by recovery processing means, the communication with the first terminal on the basis of information stored in the setting information storage means when the interrupting communication with the second terminal terminates; detecting, by terminal detection means, a third terminal when the interrupting communication with the second terminal is maintained; and starting, by transfer processing means, communication between the third terminal detected by the terminal detection means and a terminal designated by the first terminal and disconnecting the communication with the first terminal.

In such a connection control method, the setting information storage means stores a record of setting information for connection with a partner terminal with which communication is performed, the interruption processing means temporarily stops communication with a first terminal in the process of the communication with the first terminal and starts communication with a second terminal. When the interrupting communication with the second terminal terminates, the recovery processing means restarts the communication with the first terminal on the basis of information stored in the setting information storage means. When the interrupting communication with the second terminal is maintained, the transfer processing means starts communication between a third terminal detected by the terminal detection means and a terminal designated by the first terminal and disconnects the communication with the first terminal, an communication using the third terminal can be performed.

In the connection controller described above, if restart of the communication with the first terminal is; required after the interrupting communication with the second terminal starts, the communication with the first terminal can be automatically recovered by the recovery processing means without requiring a user of the communication with the first terminal to perform setting processing for restarting the communication. If a user of the first terminal desires to communicate with a user of the second terminal while the interrupting communication is maintained, the communication between the third terminal detected by the terminal detection means and the terminal designated by the first terminal can be started by the transfer processing means without requiring the user of the first terminal to perform setting processing for starting newly established communication, and the user of the first terminal is able to communicate, using the third terminal, with the user of the second terminal. Thus, the convenience of the users of the first and second terminals, which are subjected to interruption, can be enhanced.

In addition, in the connection control method described above, if restart of the communication with the first terminal is required after the interrupting communication with the second terminal starts, the communication with the first terminal can be automatically recovered by the recovery processing means without requiring a user of the communication with the first terminal to perform setting processing for restarting the communication. If a user: of the first terminal desires to communicate with a user of the second terminal while the interrupting communication is maintained, the communication between the third terminal detected by the terminal detection means and the terminal designated by the first terminal can be started by the transfer processing means without requiring the user of the first terminal to perform setting processing for starting newly established communication, and the user of the first terminal is able to communicate, using the third terminal, with the user of the second terminal. Thus, the convenience of the users of the first and second terminals, which are subjected to interruption, can be enhanced.

DESCRIPTION OF THE PREFERRED EMBODIMENTS

Embodiments of the present invention will be described with reference to the drawings.

Figure 1:
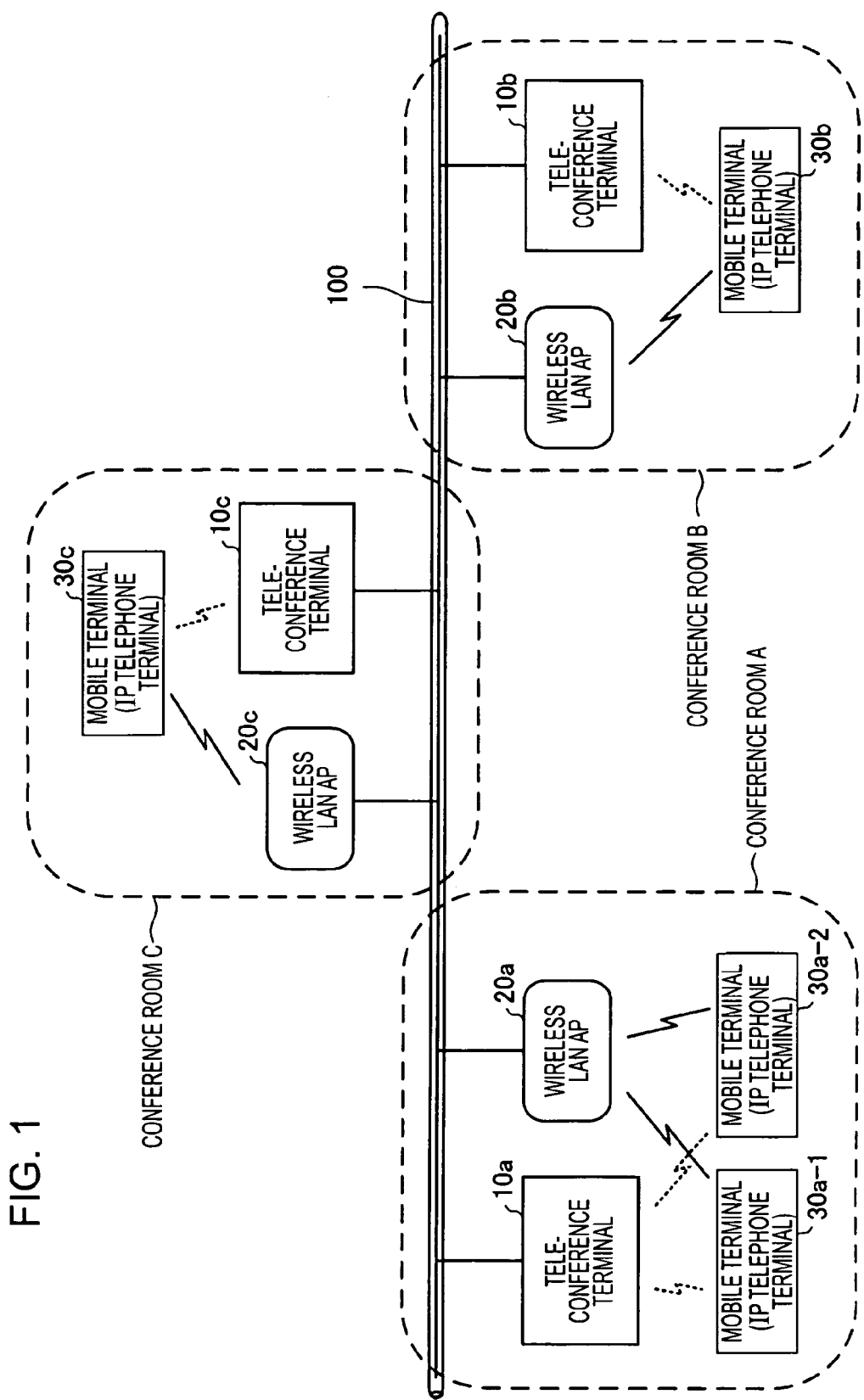
FIG. 1 shows an example of the configuration of a communication system according to an embodiment of the present invention.

FIG. 1 shows an example of the configuration of a communication system according to an embodiment of the present invention.

In FIG. 1, an example of the configuration of the communication system in which, for example, two communication services, that is, a teleconferencing service and an Internet Protocol (IP) telephone service, are implemented on a network based on a Transmission Control Protocol (TCP)/IP is shown. In addition, in this example, a case where a teleconference or IP telephone service is implemented between three conference rooms that are remote from each other, that is, conference rooms A, B, and C, is assumed.

In such a communication system, as shown in FIG. 1, teleconference terminals 10a, 10b, and 10c and wireless local-area network (LAN) access points (APs) 20a, 20b, and 20c are connected to each other via a LAN (including a wide area network (WAN) connected to a LAN) 100. In addition, mobile terminals 30a-1 and 30a-2 are capable of being wirelessly connected to the LAN 100 via the wireless LAN access point 20a. Mobile terminals 30b and 30c are capable of being wirelessly connected to the LAN 100 via the wireless LAN access points 20b and 20c, respectively.

The teleconference terminals 10a to 10c are used to have a teleconference. The teleconference terminals 10a to 10c are capable of transmitting and receiving image signals and audio signals via the LAN 100. In addition, each of the teleconference terminals 10a to 10c is provided with a wireless communication interface for performing communication based on a short-distance wireless system. Thus, the teleconference terminal 10a is capable of performing-contactless communication with the mobile terminals 30a-1 and 30a-2 based on the short-distance wireless system. Similarly, the teleconference terminals 10b and 10c are capable of performing contactless communication with the mobile terminals 30b and 30c, respectively, based on the short-distance wireless system.

The wireless LAN access points 20a to 20c are connected to the LAN 100 via wired cables. The wireless LAN access points 20a to 20c function as base stations used for wireless LAN devices (in this case, the mobile terminals 30a-1, 30a-2, 30b, and 30c) to be wirelessly connected to this circuit. In addition, the wireless LAN access points 20a to 20c may have various security functions necessary for wireless transmission and reception.

The mobile terminals 30a-1, 30a-2, 30b, and 30c function as remote stations to be connected to the LAN 100 via the wireless LAN access points 20a to 20c. This connection enables the mobile terminals 30a-1, 30a-2, 30b, and 30c to function as conversation terminals in an IP telephone service based on a Voice over Internet Protocol (VoIP). In addition, each of the mobile terminals 30a-1, 30a-2, 30b, and 30c is provided with a communication interface for performing communication based on the short-distance wireless system. Thus, the mobile terminals 30a-1, 30a-2, 30b, and 30c are capable of performing contactless communication with the teleconference terminals 10a to 10c based on the short-distance wireless system.

In this communication system, the teleconference terminal 10a and the wireless LAN access point 20a are installed in the conference room A, and two of users of the teleconference terminal 10a are able to perform conversation via the IP telephone service using the mobile terminals 30a-1 and 30a-2. In addition, the mobile terminals 30a-1 and 30a-2 are capable of communicating with the teleconference terminal 10a via short-distance wireless communication. When the teleconference terminal 10a detects and authenticates the mobile terminal 30a-1 or 30a-2 via short-distance wireless communication in the process of execution of a teleconference application, the teleconference terminal 10a is capable of transmitting and receiving information to and from the mobile terminal 30a-1 or 30a-2 via short-distance wireless communication or is then capable of performing an operation by being connected to the mobile terminal 30a-1 or 30a-2 via the LAN 100 and receiving, for example, a control command from the mobile terminal 30a-1 or 30a-2.

In addition, the teleconference terminal 10b and the wireless LAN access point 20b are installed in the conference room B, and the teleconference terminal 10c and the wireless LAN access point 20c are installed in the conference room C. One of users of the teleconference terminal 10b who carries the mobile terminal 30b is able to perform conversation via the wireless LAN access point 20b. One of users of the teleconference terminal 10c who carries the mobile terminal 30c is able to perform conversation via the wireless LAN access point 20c. In addition, the mobile terminals 30b and 30c are capable of performing communication with the teleconference terminals 10b and 10c, respectively, via the short-distance wireless system. After being detected and authenticated by the teleconference terminals 10b and 10c, respectively, the mobile terminals 30b and 30c are capable of transmitting and receiving information to and from the teleconference terminals 10b and 10c, respectively, based on the short-distance communication or via the LAN 100.

Figure 2:
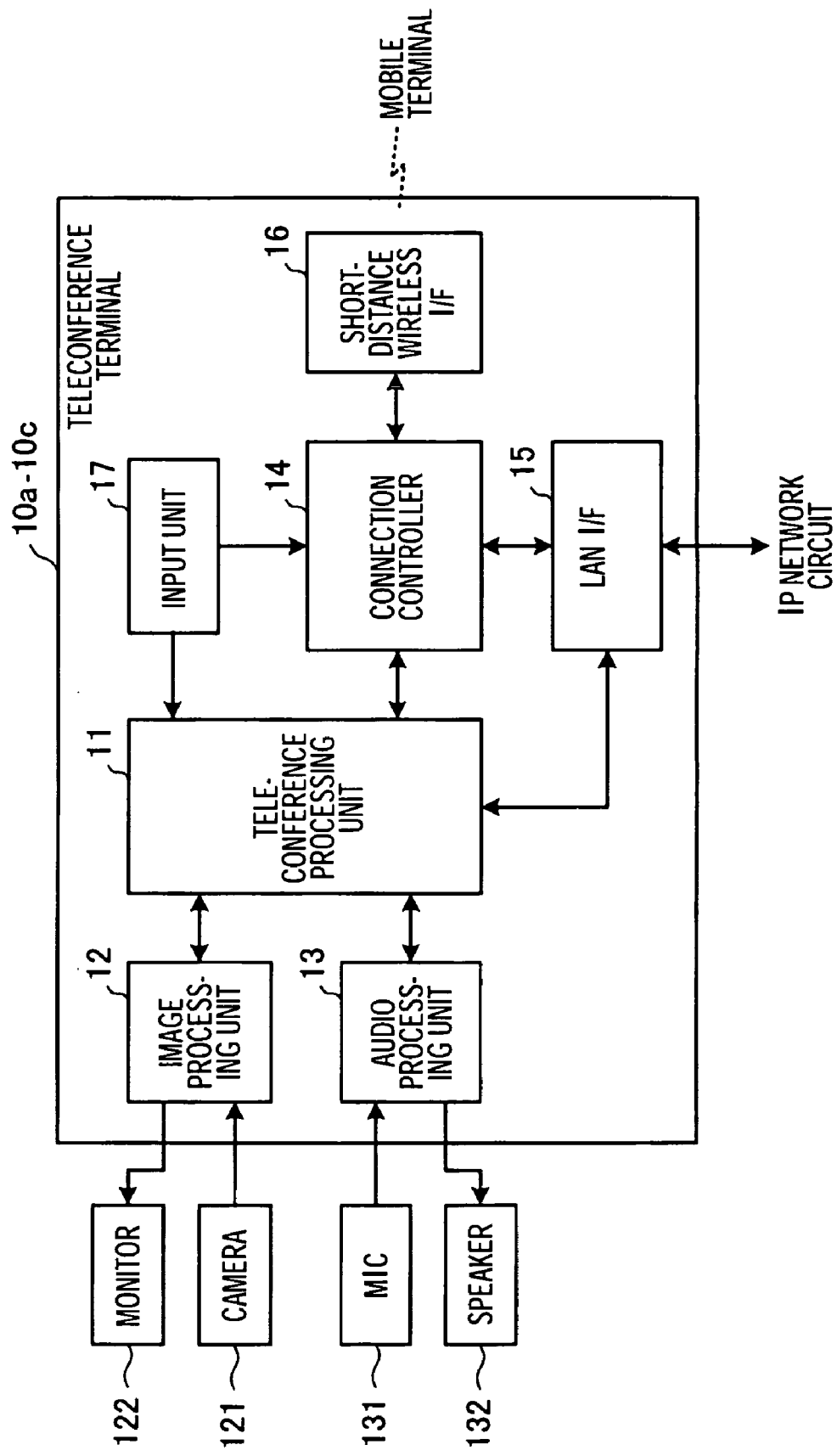
FIG. 2 is a block diagram showing the internal configuration of a teleconference terminal.

FIG. 2 is a block diagram showing the internal configuration of each of the teleconference terminals 10a to 10c.

The teleconference terminals 10a to 10c each have the same configuration. Referring to FIG. 2, each of the teleconference terminals 10a to 10c includes a teleconference processing unit 11, an image processing unit 12, an audio processing unit 13, a connection controller 14, a LAN interface 15, a short-distance wireless interface 16, and an input unit 17.

The teleconference processing unit 11 performs processing for implementing a teleconference. More specifically, the teleconference processing unit 11 performs basic processing for receiving a teleconferencing service, such as setting for connection with a partner terminal of the teleconference, setting for image-capturing and recording functions, and setting for outputting of image and audio signals, and input and output processing of image signals and audio signals, that is, processing of outputting to the connection controller 14 or the LAN interface 15 image signals received from the image processing unit 12 and audio signals received from the audio processing unit 13 and outputting to the image processing unit 12 and the audio processing unit 13 image signals and audio signals, respectively, input from the LAN interface 15 or the connection controller 14.

The image processing unit 12 converts an image signal received from an externally connected camera 121 into a digital signal, encodes the digital signal into a predetermined format, and outputs the encoded signal to the teleconference processing unit 11. In addition, the image processing unit 12 decodes an image signal received from the teleconference processing unit 11 into an analog signal, outputs the analog signal to an externally connected monitor 122, and causes the monitor 122 to display the analog signal. The audio processing unit 13 converts an audio signal received from an externally connected microphone 131 into a digital signal, encodes the digital signal into a predetermined format, and outputs the encoded signal to the teleconference processing unit 11. In addition, the audio processing unit 13 decodes an audio signal received from the teleconference processing unit 11 into an analog signal, outputs the analog signal to an externally connected speaker 132, and causes the speaker 132 to reproduce the analog signal.

The connection controller 14 performs processing for enabling the mobile terminals 30a-1, 30a-2, 30b, and 30c detected by the short-distance wireless interface 16 to control the operation of the teleconference processing unit 11. For example, in accordance with a signal received from the input unit 17 or a control command received via the short-distance wireless interface 16 or the LAN interface 15 from the mobile terminal 30a-1, 30a-2, 30b, or 30c, the connection controller 14 controls connection with a conference partner and controls transfer of image signals and audio signals between the teleconference processing unit 11 and the LAN interface 15. In addition, the connection controller 14 performs authentication processing and device management processing for the mobile terminal 30a-1, 30a-2, 30b, or 30c detected by the short-distance wireless interface 16.

The LAN interface 15 is connected to the LAN 100, and controls transfer of signals between the LAN 100 and the connection controller 14. The short-distance wireless interface 16 is used for performing communication with the mobile terminals 30a-1, 30a-2, 30b, and 30c via the short-distance wireless system. In this embodiment, an electromagnetic induction communication system using a wireless IC chip is adopted as the short-distance wireless system. The short-distance wireless interface 16 includes a reader/writer that supplies electric power to the wireless IC chip provided in each of the mobile terminal 30a-1, 30a-s, 30b, and 30c and that transmits and receives signals to and from the wireless IC chip. The input unit 17 includes an input key and the like. The input unit 17 outputs to the connection controller 14 a control signal corresponding to operation control input by a user.

A function for causing the mobile terminals 30a-1, 30a-2, 30b, or 30c to control teleconference processing may be provided as a device independent of a teleconference terminal. In this case, for example, the teleconference terminal includes an interface for the LAN 100. The teleconference terminal communicates with a partner terminal and transmits and receives images and sound to and from the partner terminal under self-control. In addition, functions of the connection controller 14 and the short-distance wireless interface 16 shown in FIG. 2 are provided as external expansion devices. When the expansion devices are connected to the teleconference terminal using communication means, such as a universal serial bus (USB), communication of the teleconference terminal via the LAN 100 is performed through the expansion devices, and the teleconference terminal and the mobile terminal 30a-1, 30a-2, 30b, and 30c are capable of being used as control terminals of a teleconference.

Figure 3:
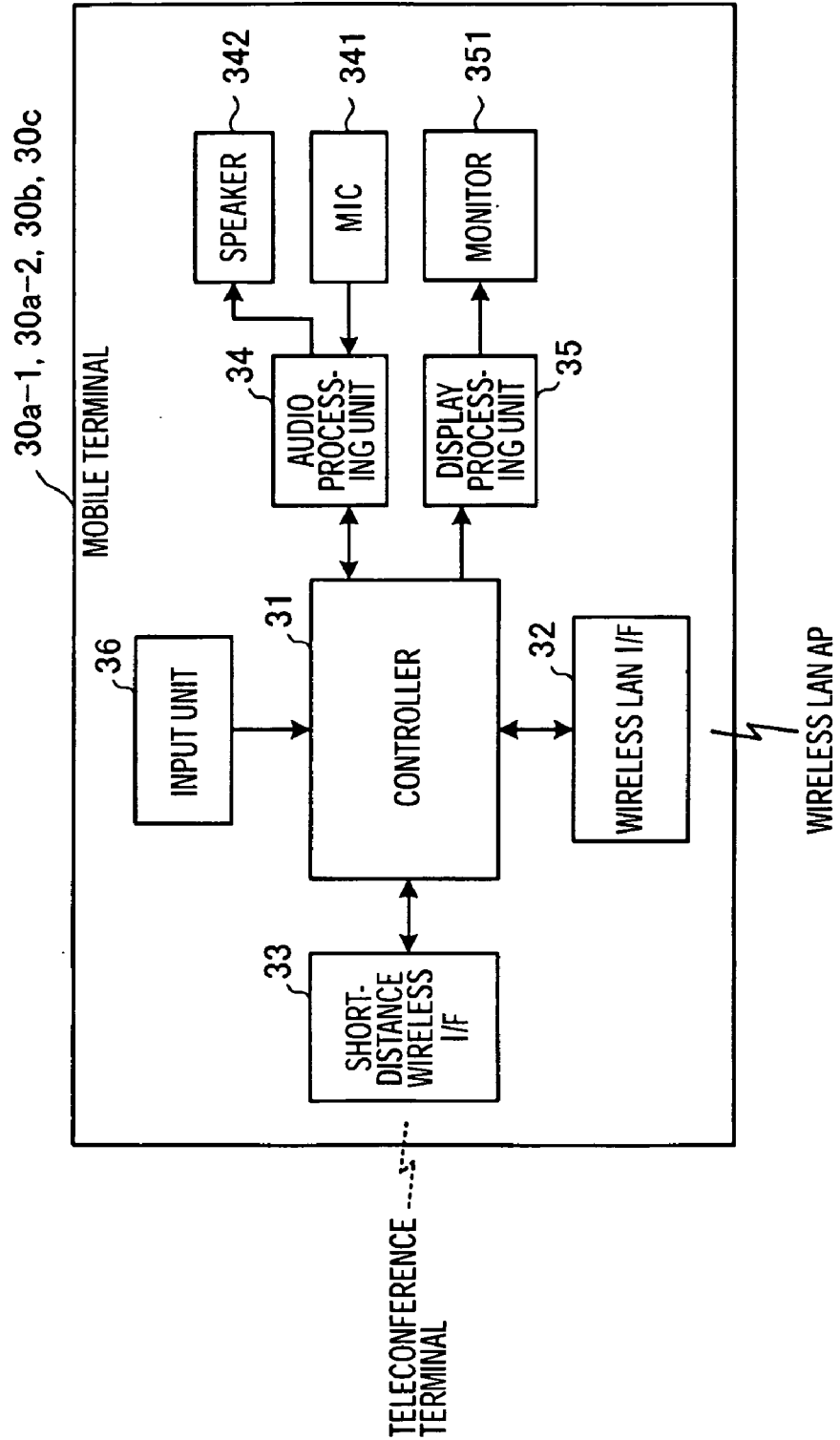
FIG. 3 is a block diagram showing the internal configuration of a mobile terminal.

FIG. 3 is a block diagram showing the internal configuration of each of the mobile terminals 30a-1, 30a-2, 30b, and 30c.

The mobile terminals 30a-1, 30a-2, 30b, and 30c each have the same configuration. Referring to FIG. 3, each of the mobile terminals 30a-1, 30a-2, 30b, and 30c includes a controller 31, a wireless LAN interface 32, a short-distance wireless interface 33, an audio processing unit 34, a display processing unit 35, an input unit 36, a microphone 341, a speaker 342, and a monitor 351.

The controller 31 includes a central processing unit (CPU), a memory in which programs and various data performed by the CPU are stored, and the like. The controller 31 generally controls blocks inside each of the mobile terminals 30a-1, 30a-2, 30b, and 30c. More specifically, the controller 31 performs conversation processing over the IP telephone service via the wireless LAN interface 32, in other words, performs processing of outputting to the wireless LAN interface 32 audio signals received from the audio processing unit 34 and outputting to the audio processing unit 34 audio signals received via the wireless LAN interface 32. In addition, the controller 31 performs processing for causing various data, such as address information and control commands, to be transferred via the wireless LAN interface 32 or the short-distance wireless interface 33 and processing for generating display information for the monitor 351 and outputting the display information to the display processing unit 35.

The wireless LAN interface 32 is an interface circuit to be connected to the LAN 100 via the wireless LAN access points 20a to 20c. The wireless LAN interface 32 demodulates signals received from the wireless LAN access points 20a to 20c, and supplies the demodulated signals to the controller 31. In addition, the wireless LAN interface; 32 modulates signals output from the controller 31, and wirelessly transmits the modulated signals to the wireless LAN access points 20a to 20c.

The short-distance wireless interface 33 includes a wireless IC chip for performing communication based on the electromagnetic induction communication system, an antenna for transmitting and receiving signals, and the like. The short-distance wireless interface 33 performs an operation by generating electric power in accordance with electric waves received from readers/writers (the short-distance wireless interface 16) provided in the teleconference terminals 10a to 10c, and transmits and receives signals to and from the teleconference terminals 10a to 10c.

The audio processing unit 34 converts an audio signal received from the microphone 341 into a digital signal, encodes the digital signal into a predetermined format, and outputs the encoded signal to the controller 31. In addition, the audio processing unit 34 decodes an audio signal received from the controller 31 into an analog signal, outputs the analog signal to the speaker 342, and causes the speaker 342 to reproduce the analog signal. The display processing unit 35 generates an image signal on the basis of display information generated by the controller 31, outputs the image signal to the monitor 351, which is, for example, a liquid crystal display (LCD), and causes the monitor 351 to display the image signal. The input unit 36 includes an input key and the like. The input unit 36 outputs to the controller 31 a control signal corresponding to operation control input by the user.

Although an electromagnetic induction communication system is adopted as a short-distance wireless communication system for performing direct communication between the teleconference terminals 10a to 10c and the mobile terminals 30a-1, 30a-2, 30b, and 30c in this embodiment, other systems, such as a Bluetooth™ system and an infrared-ray communication system, may be adopted. In addition, instead of wireless communication, a communication system using a relatively short wired cable, such as a USB or IEEE (Institute of Electrical and Electronic Engineers) 1394, may be adopted.

An operation in such a communication system performed when a communication session based on a teleconferencing service is interrupted by another communication session is described next. In this communication system, for example, after the interrupting communication session terminates, the original communication session immediately before the interruption can be recovered easily. In addition, in the process of the interrupting communication session, the original communication session can be transferred to another communication using a mobile terminal.

The outline of the operation of the entire system will be described with reference to FIGS. 4 to 7.

FIGS. 4 to 7 illustrate the outline of communication interruption.

Figure 4:
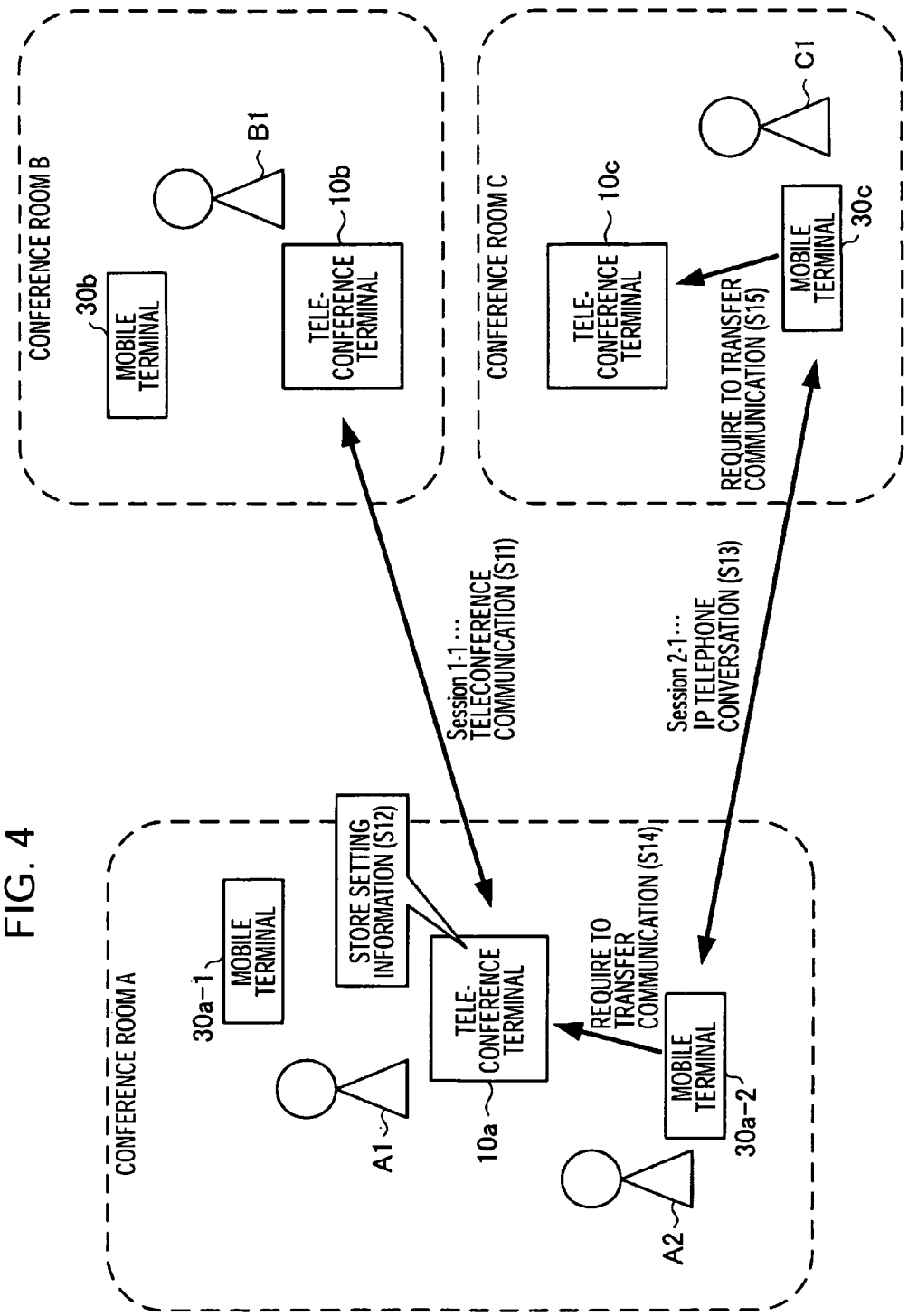
FIG. 4 is a first illustration for explaining the outline of communication interruption.

Referring to FIG. 4, users A1 and B1 are having a teleconference using the teleconference terminals 10a and 10b, respectively (step S11). This communication session is represented as session 1-1. A teleconference can be started by operating only the teleconference terminals 10a and 10b. However, for example, a state in which the users A1 and B1 perform conversation over an IP telephone service using the mobile terminals 30a-1 and 30b, respectively, can be transferred to communication between the teleconference terminals 10a and 10b.

In this case, for example, when the user A1 brings the mobile terminal 30a-1 closer to the teleconference terminal 10a, the teleconference terminal 10a acknowledges the mobile terminal 30a-1 via the short-distance wireless system, and reports to the mobile terminal 30a-1 the IP address of the teleconference terminal 10a. The mobile terminal 30a-1 reports, via the IP telephone service, to the mobile terminal 30b the reported IP address. The mobile terminal 30b reports, via short-distance wireless communication or an IP network (that is, the LAN 100), to the teleconference terminal 10b the reported IP address. Then, the mobile terminal 30b requires the teleconference terminal 10b to establish connection with the teleconference terminal 10a.

Each of the teleconference terminals 10a to 10c has a function to store setting information for connection, such as an IP address and a port number, of a communication partner in a teleconference as history information. With this function, when the teleconferencing communication starts, each of the teleconference terminals 10a and 10b stores setting information of a corresponding partner terminal (step S12).

Then, in the process of the teleconference communication based on the communication session 1-1, for example, the necessity of referring to a user C1 in the conference room C occurs. In this case, for example, a user A2 in the conference room A originates a call to the mobile terminal 30c of the user C1, and conversion over the IP telephone service starts (step S13). This communication is represented as session 2-1. Then, if the communication with the user C1 requires images, as well as sound, a teleconference based on connection between the teleconference terminal 10c of the user C1 and the teleconference terminal 10a in the conference room A is required.

Here, in order to transfer the communication (session 2-1) between the mobile terminal 30a-2 of the user A2 and the mobile terminal 30c of the user C1 to communication (session 2-2 (see FIG. 5)) between the teleconference terminal 10a and the teleconference terminal 10c, the mobile terminals 30a-2 and 30c are brought closer to the teleconference terminals 10a and 10c, respectively. Then, after the mobile terminals 30a-2 and 30c are detected and authenticated, both the mobile terminals 30a-2 and 30c (or one of the mobile terminals 30a-2 and 30c) require(s) to transfer the communication (steps S14 and S15). The users A2 and C1 may directly operate the teleconference terminals 10a and 10c, respectively, so that communication between the teleconference terminals 10a and 10c can start.

Figure 5:
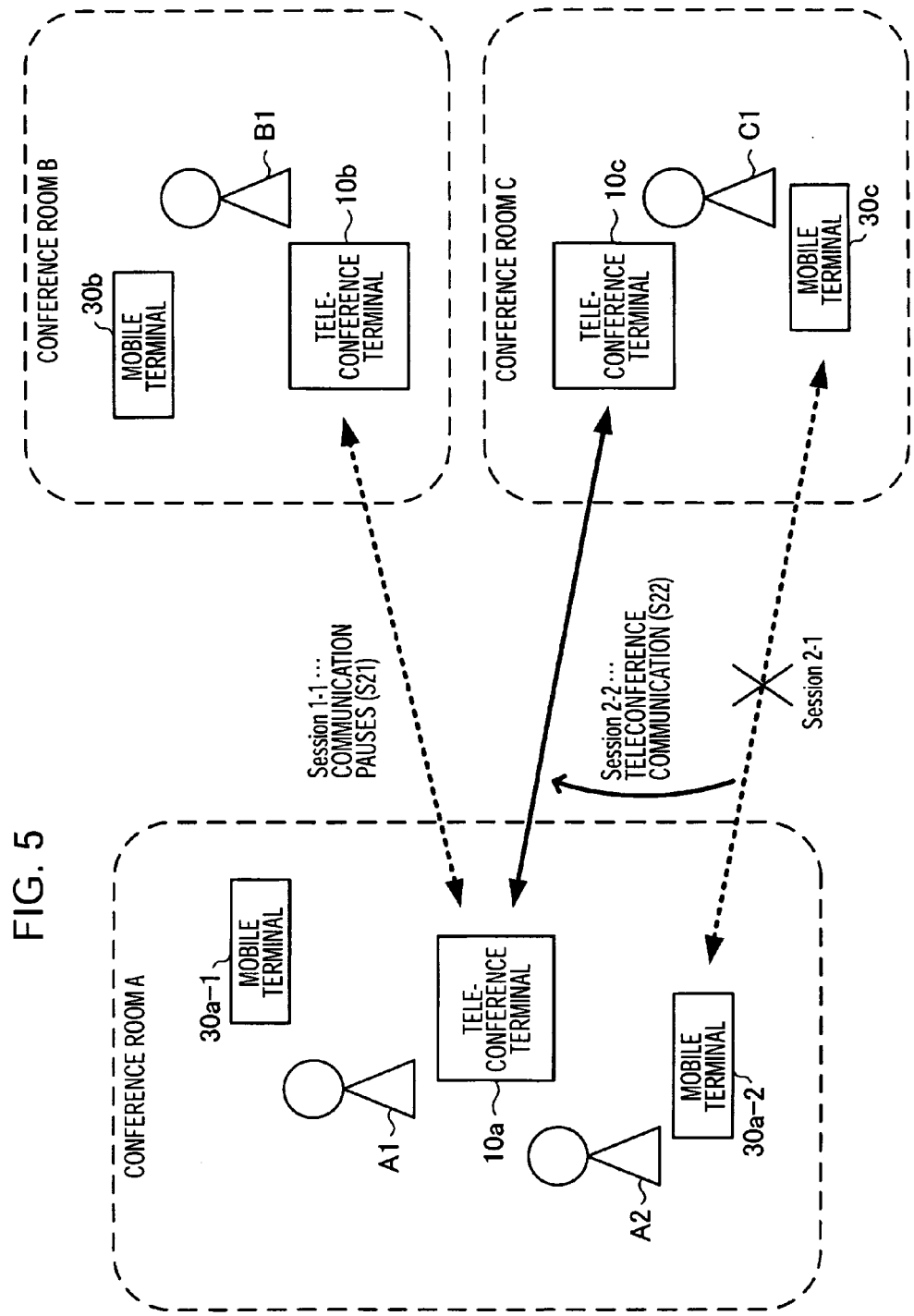
FIG. 5 is a second illustration for explaining the outline of communication interruption.

Since the teleconference terminal 10a is communicating with the teleconference terminal 10b in the session 1-1, the session 1-1 is interrupted by the session 2-2. Referring to FIG. 5, the teleconference terminal 10a causes the session 1-1 with the teleconference terminal 10b to pause (step S21). Then, the teleconference terminal 10a starts communication with the teleconference terminal 10c in the session 2-2 (step S22). In the session 1-1, although teleconference processing, that is, transmission and reception of image data and audio data, stops, for example, predetermined information, such as a status report, may be transmitted and received with a predetermined interval.

Figure 6:
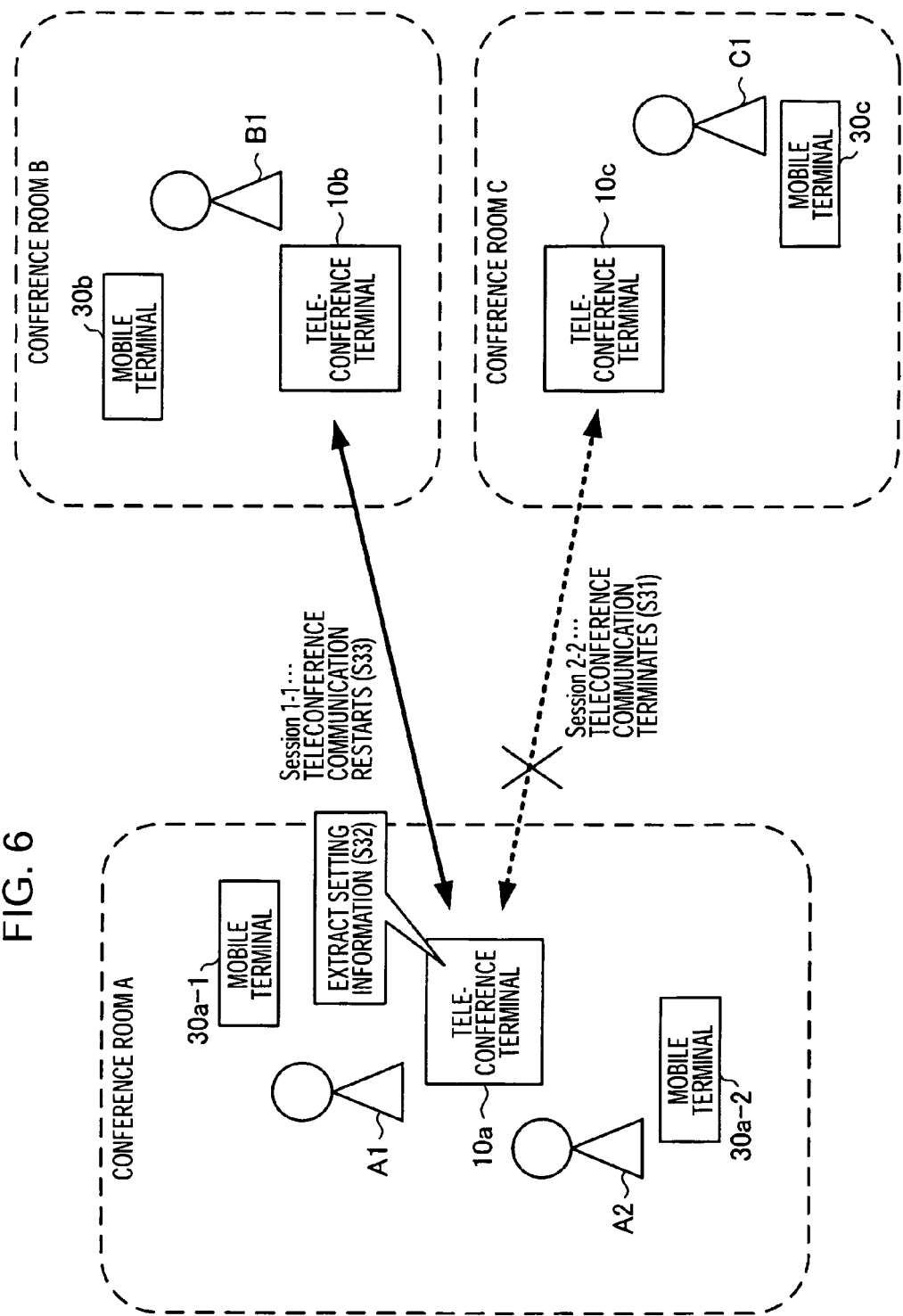
FIG. 6 is a third illustration for explaining the outline of communication interruption.

In accordance with the processing described above, the user A2 in the conference room A is able to have a teleconference with the user C1 in the conference room C. If the teleconference with the conference room B restarts after termination of the teleconference with the conference room C, as shown in FIG. 6, the teleconference terminal 10a terminates the communication session 2-2 with the teleconference terminal 10c (step S31). Then, the teleconference terminal 10a extracts setting information of the session 1-1 from among stored setting information records (step S32). Then, the teleconference terminal 10a is connected to the teleconference terminal 10b using the extracted setting information, and restarts the teleconference (step S33). In accordance with the processing described above, the users A1, A2, and B1 do not need to re-perform an operation for establishing connection between the teleconference terminals 10a and 10b, and are able to easily restart a teleconference with the original partner.

Figure 7:
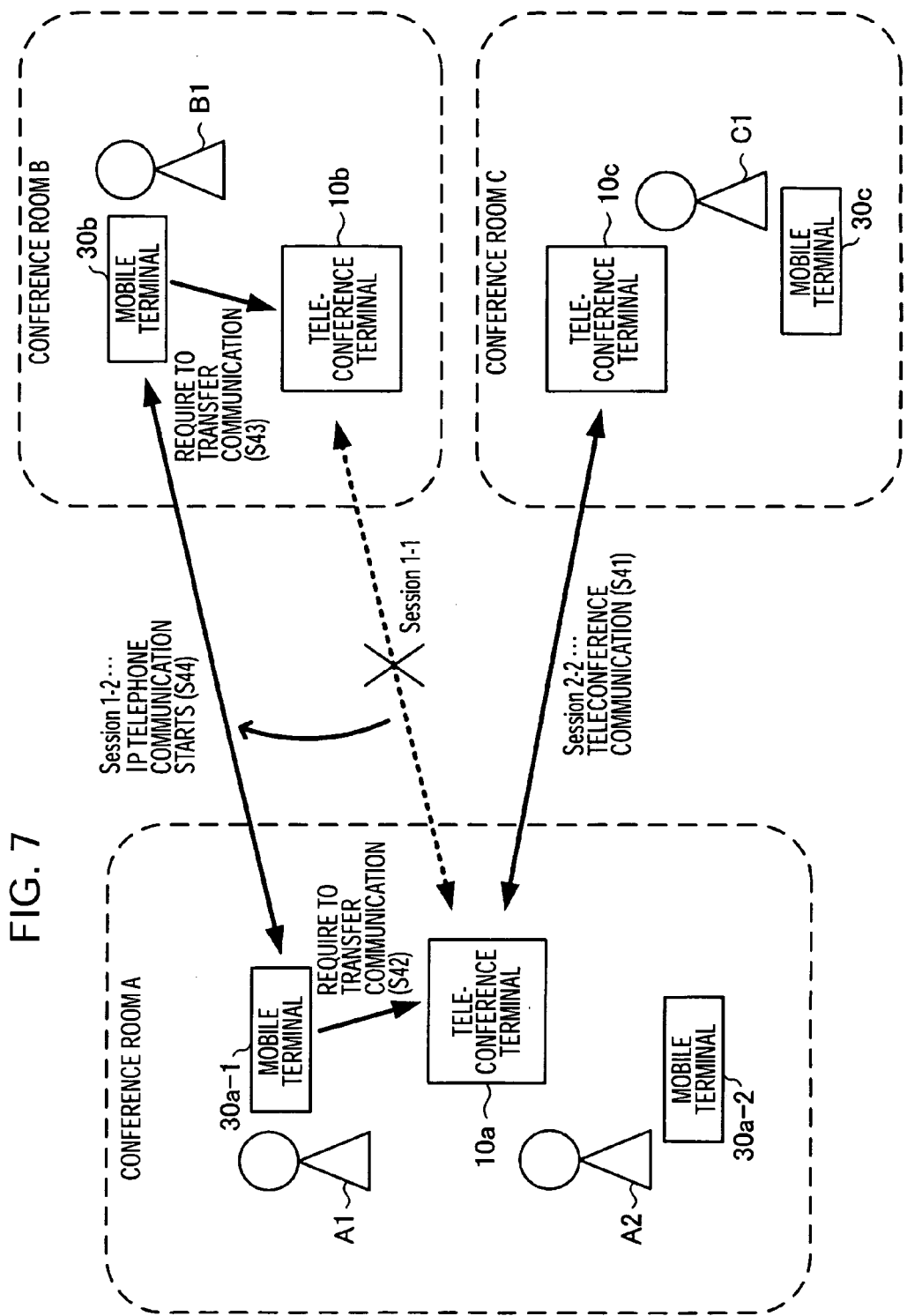
FIG. 7 is a fourth illustration for explaining the outline of communication interruption.

In contrast, in a case where the teleconference with the conference room C needs to be continued for a while, for example, it will be convenient to be able to contact a user in the conference room B over the IP telephone service or to be able to continue the conference with the conference room B using the IP telephone service, according to need. In such a case, as shown in FIG. 7, in a state where the session 2-2 between the teleconference terminals 10a and 10c is continued (step S41), the users A1 and B1 require, using the mobile terminals 30a-1 and 30b via short-distance wireless communication or the like, the teleconference terminals 10a and 10b to transfer the communication session 1-1 (steps S42 and 43). Such transfer requests may be performed by operation control input to the teleconference terminals 10a and 10b. In this case, however, the teleconference terminals 10a and 10b must acknowledge the mobile terminals 30a-1 and 30b, respectively, in advance via the short-distance wireless system.

By communicating with the mobile terminal 30a-1, the teleconference terminal 10a is capable of acquiring setting information of the mobile terminal 30a-1 necessary for connection via the IP telephone service, such as an IP address. Thus, the teleconference terminal 10a is capable of starting communication (session 1-2) between the mobile terminals 30a-1 and 30b over the IP telephone service by reporting, via the teleconferencing session 1-1, to the teleconference terminal 10b the acquired setting information and by requiring the teleconference terminal 10b to cause the mobile terminal 30b to originate a call. Alternatively, the teleconference terminal 10a is capable of starting the session 1-2 by acquiring, via the teleconference terminal 10b, setting information of the mobile terminal 30b, such as an IP address, and by reporting to the mobile terminal 30a-1 the setting information. Then, by disconnecting the original session 1-1 when the session 1-2 starts, transfer of the communication session is performed (step S44).

In accordance with the processing described above, the users A1 and B1 are able to transfer a teleconferencing communication session to a communication session between the mobile terminals 30a-1 and 30b by an easy operation without performing an operation for setting a telephone number, an IP address, and the like, and are able to continue conversation.

Although the session 1-1 is transferred to the session 1-2 between the mobile terminals 30a-1 and 30b in the operation described above, for example, the session 1-1 may be transferred to another communication session newly established between the mobile terminal 30a-1 and the teleconference terminal 10b.

A more specific example of a process performed when communication is interrupted is described next.

Figure 8:
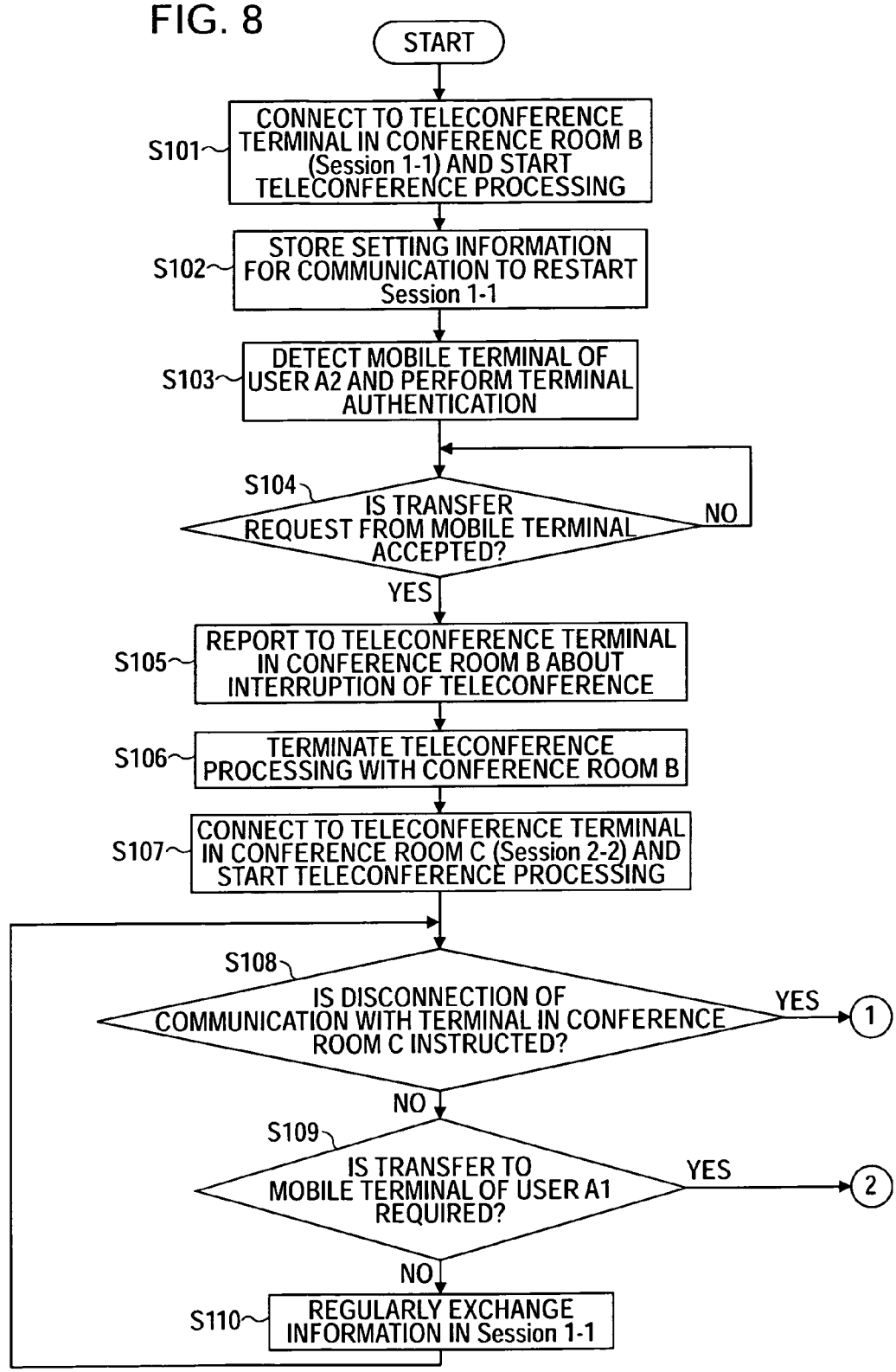
FIG. 8 is a flowchart of a process performed by a teleconference terminal in a conference room from interruption of communication to recovery of the communication or to start of transfer processing.

FIG. 8 is a flowchart of a process performed by the teleconference terminal 10a from interruption of communication to recovery of the communication or to start of transfer processing.

In step S101, the connection controller 14 is connected to the teleconference terminal 10b in the conference room B via the LAN interface 15 (session 1-1), and causes the teleconference processing unit 11 to start teleconference processing using image and audio data.

In step S102, the connection controller 14 stores setting information for communication (for example, an IP address of the teleconference terminal 10b) for restarting the session 1-1.

In step S103, the connection controller 14 detects, via the short-distance wireless interface 16, the mobile terminal 30a-2 carried by the user A2, and performs authentication processing for the mobile terminal 30a-2. Accordingly, the teleconference terminal 10a enters a state in which communication with the mobile terminal 30a-2 can be performed.

In step S104, the connection controller 14 waits for a request from the mobile terminal 30a-2 for transfer to the session 2-2. If the connection controller 14 accepts the request, the process proceeds to step S105. The connection controller 14 receives a transfer request for a communication session, for example, via the short-distance wireless interface 16 or via the LAN 100 using the LAN interface 15. For example, when the connection controller 14 reports to the mobile terminal 30a-2 the IP address of the teleconference processing unit 11 in the authentication processing in step S103, the mobile terminal 30a-2 is capable of communicating with the teleconference terminal 10a by accessing the teleconference terminal 10a using the reported IP address via the wireless LAN access point 20a and the LAN 100.

In step S105, the connection controller 14 reports, via the LAN interface 15, to the teleconference terminal 10b, which is being currently connected, about interruption of the teleconference. Thus, the teleconference terminal 10b reports, by display or the like, to the user B1 or the like about the interruption of the teleconference.

In step S106, the connection controller 14 causes the teleconference processing unit 11 to terminate the teleconference processing with the teleconference terminal 10b, and causes the session 1-1 to pause.

In step S107, the connection controller 14 is connected to the teleconference terminal 10c in the conference room C via the LAN interface 15 to start the session 2-2, and causes the teleconference processing unit 11 to start processing. By the processing described above, the interruption by the session 2-2 with the teleconference terminal 10c is completed, and the teleconference with the conference room C starts.

In step S108, the connection controller 14 determines whether or not an instruction for disconnecting the communication with the teleconference terminal 10c, which is currently communicating with the teleconference terminal 10a, is given. The connection controller 14 is capable of receiving a disconnection instruction, for example, in accordance with operation control input to the input unit 17 by the user A2 or the like or in accordance with a request signal from the mobile terminal 30a-2 via the LAN interface 15 (or the short-distance wireless interface 16). If the connection controller 14 receives a disconnection instruction, the process proceeds to step S201 in FIG. 9. If the connection controller 14 does not receive a disconnection instruction, the process proceeds to step S109.

In step S109, the connection controller 14 determines whether or not a request for transferring a communication session to the mobile terminal 30a-1 of the user A1 is given. The connection controller 14 receives such a request in accordance with a request signal from the mobile terminal 30a-1 via the LAN interface 15 (or the short-distance wireless interface 16). Alternatively, the connection controller 14 may receive such a request from the mobile terminal 30b of the user B1 via the teleconference terminal 10b. Alternatively, the connection controller 14 may receive such a request in accordance with operation control input to the input unit 17 of the teleconference terminal 10a by the user. In this case, however, the teleconference terminal 10a needs to acknowledge the mobile terminal 30a-1 in advance via short-distance wireless communication. If the connection controller 14 receives a transfer request, the process proceeds to step S301 in FIG. 10. If the connection controller 14 does not receive a transfer request, the process proceeds to step S110.

If the connection controller 14 does not receive an instruction in step S108 and the connection controller 14 does not receive a request in step S109, in step S110, the connection controller 14 keeps the communication session 2-2 with the teleconference terminal 10c, and at the same time, keeps the communication session 1-1 with the teleconference terminal 10b by regularly transmitting and receiving, for example, information reporting conditions of the teleconference terminals 10a and 10b, using an IP address stored as history information.

Figure 9:
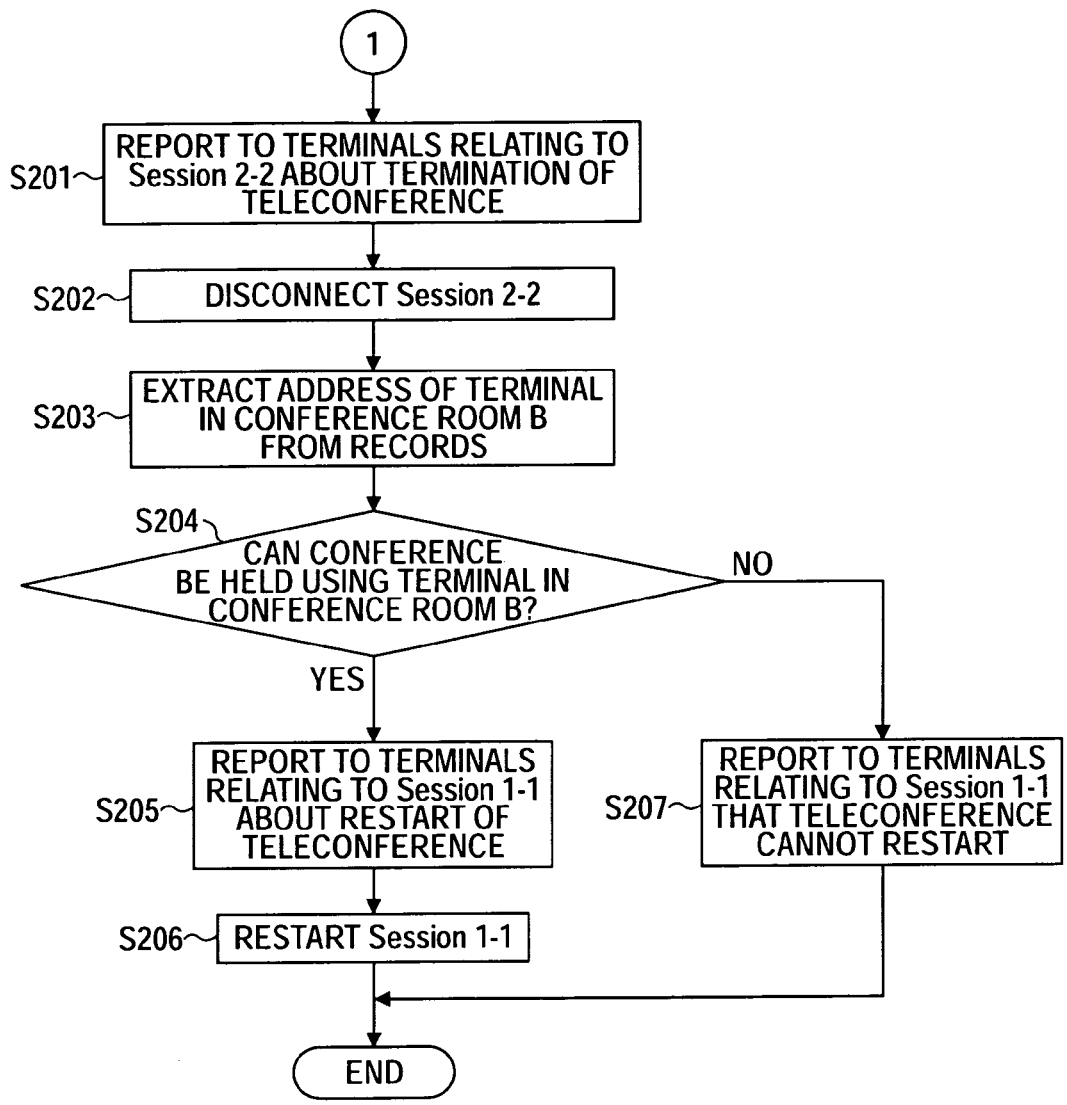
FIG. 9 is a flowchart of a process performed by the teleconference terminal in the conference room when the original communication session is recovered after the communication interruption.

FIG. 9 is a flowchart of a process performed by the teleconference terminal 10a when the original communication session is recovered after the communication is interrupted.

If the connection controller 14 receives an instruction for disconnecting the communication with the teleconference terminal 10c, in step S201, the connection controller 14 reports, via the LAN interface 15, to terminals relating to the present session 2-2, that is, the teleconference terminal 10c in the conference room C and the mobile terminal 30a-2 of the user A2 (in a case where the teleconference based on the session 2-2 started in accordance with session transfer from these terminals) about termination of the teleconference. Thus, each of the terminals reports, by display or the like, to the corresponding user about termination of the teleconference, and the teleconference terminal 10c starts termination processing for the teleconference.

In step S202, the connection controller 14 causes the teleconference processing unit 11 to stop the processing with the teleconference terminal 10c, and disconnects the session 2-2 with the teleconference terminal 10c.

In step S203, the connection controller 14 extracts, from among records, the IP address of the teleconference terminal 10b in the conference room B.

In step S204, the connection controller 14 accesses the teleconference terminal 10b via the LAN interface 15 using the extracted IP address, and queries-whether or not the teleconference can restart. If a reply indicating that the teleconference can restart is given, the process proceeds to step S205. If a reply indicating that the teleconference cannot restart is given, the process proceeds to step S207.

In step S205, the connection controller 14 reports, via the LAN interface 15, to terminals relating to the session 1-1, which is to restart, that is, the teleconference terminal 10b and the mobile terminal 30a-1 of the user A1 (in a case where the teleconference based on the session 1-1 started in accordance with session transfer from these terminals) about restart of the teleconference. Each of the terminals reports, by display or the like, to the corresponding user about restart of the teleconference.

In step S206, the connection controller 14 restarts the communication session 1-1 with the teleconference terminal 10b, and causes the teleconference processing unit 11 to start image and audio processing. If there is information necessary for connection for restarting the communication, such information is extracted from records and used. In accordance with the processing described above, teleconference processing between the teleconference terminals 10a and 10b automatically restarts without particularly requiring the user A1 and B1 to perform a setting operation for connection.

If the teleconference cannot be held using the teleconference terminal 10b, in step S207, the connection controller 14 reports, via the LAN interface 15, to terminals relating to the session 1-1, that is, the teleconference terminal 10b and the mobile terminal 30a-1 of the user A1 (in a case where the teleconference based on the session 1-1 started in accordance with session transfer from these terminals) that the teleconference cannot restart, and terminates the process.

Figure 10:
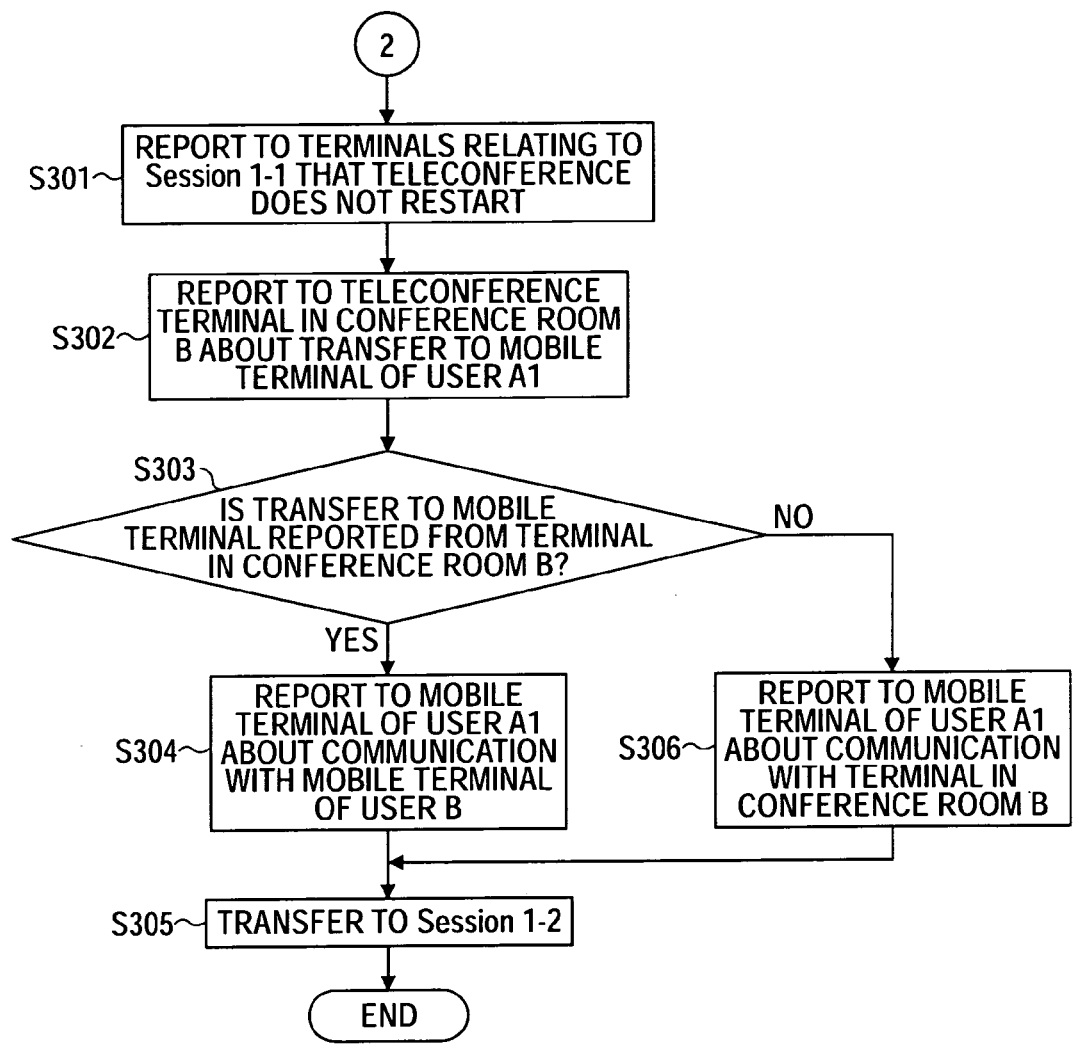
FIG. 10 is a flowchart of a process performed by the teleconference terminal in the conference room when the original communication session is transferred to another communication session after the communication interruption.

FIG. 10 is a flowchart of a process performed by the teleconference terminal 10a when the original communication session is transferred to another communication session after communication interruption.

In step S301, if a request for transfer to the session 1-2 is given, the connection controller 14 reports, via the LAN interface 15, to terminals relating to the session 1-1, which is pausing, that is, the teleconference terminal 10b and the mobile terminal 30a-1 of the user A1 (in a case where the teleconference based on the session 1-1 started in accordance with session transfer from these terminals) that the teleconference does not restart.

In step S302, the connection controller 14 reports, via the LAN interface 15, to the teleconference terminal 10b that the communication session is transferred to the mobile terminal 30a-1 of the user A1.

The teleconference terminal 10b reports, by display or the like, to the user B1 reported information or the like, and waits for a reply from the mobile terminal 30b of the user B1. Then, when the user B1 brings the mobile terminal 30b closer to the teleconference terminal 10b and mutual authentication is achieved via short-distance wireless communication, the teleconference terminal 10b determines that transfer to the mobile terminal 30b can be performed. Then, the teleconference terminal 10b reports to the teleconference terminal 10a that transfer to the mobile terminal 30b can be performed. For example, if the mobile terminal 30b cannot be detected over a predetermined period or more or if an operation indicating that transfer cannot be performed is input using the input unit 17, the teleconference terminal 10b reports to the teleconference terminal 10a that the communication session cannot be transferred to the mobile terminal 30b.

In step S303, the connection controller 14 of the teleconference terminal 10a determines whether or not the communication session can be transferred to the mobile terminal 30b in accordance with a reply signal from the teleconference terminal 10b. If the communication session can be transferred to the mobile terminal 30b, the process proceeds to step S304. If the communication session cannot be transferred to the mobile terminal 30b, the process proceeds to step S306.

In step S304, the connection controller 14 reports, via the LAN interface 15, to the mobile terminal 30a-1 of the user A1 that communication with the mobile terminal 30b of the user B1 starts.

In step S305, the connection controller 14 performs transfer processing to the session 1-2 between the mobile terminals 30a-1 and 30b. A specific example of this transfer processing will be described later with reference to FIGS. 11A and 11B.

If transfer to the mobile terminal 30b cannot be performed, in step S306, the connection controller 14 reports, via the LAN interface 15, to the mobile terminal 30a-1 of the user A1 that communication with the teleconference terminal 10b in the conference room B starts. Then, the process proceeds to step S305, and transfer processing to the session 1-2 (however, here, a communication session newly established between the mobile terminal 30a-1 and the teleconference terminal 10b) is performed.

Figure 11A:
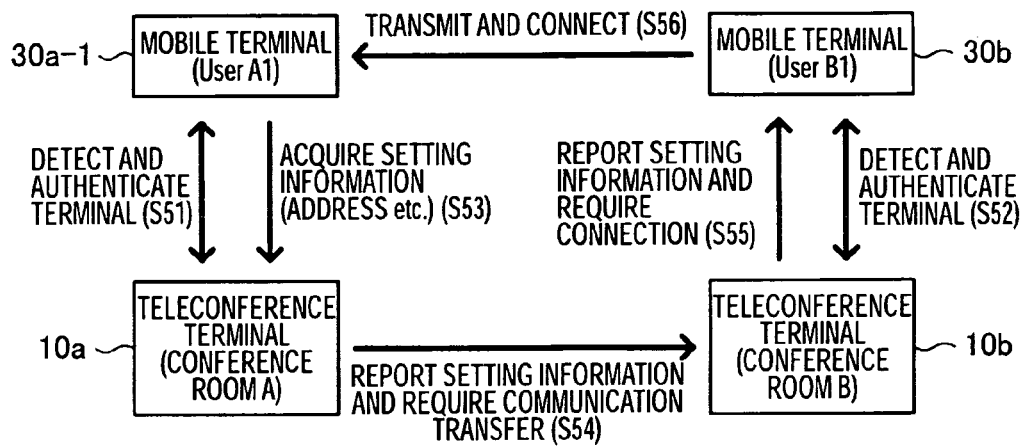
FIGS. 11A and 11B show examples of a process for transfer to a communication session newly established using a mobile terminal.
Figure 11B:
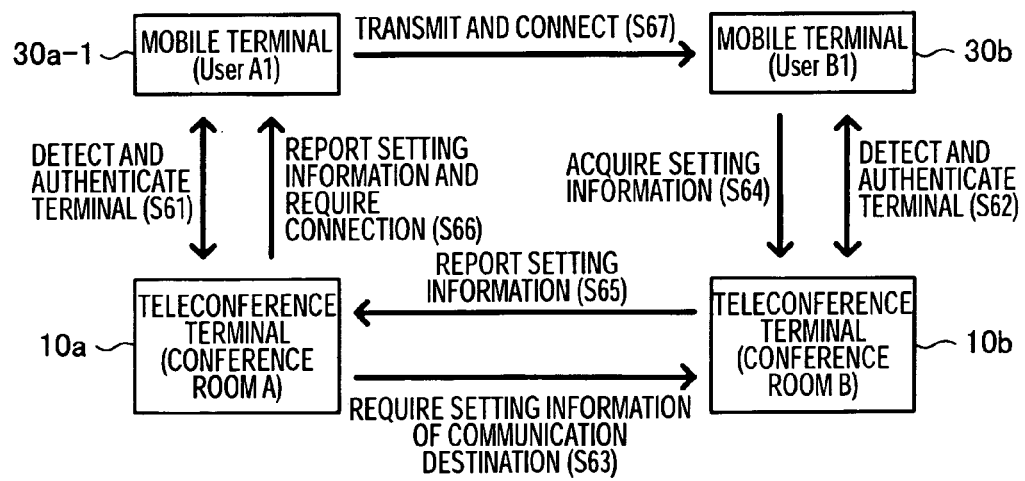

FIGS. 11A and 11B show examples of a process for transfer to a communication session newly established between the mobile terminals 30a-1 and 30b.

In the example shown in FIG. 11A, the mobile terminal 30a-1 and the teleconference terminal 10a detect and authenticate each other in step S51, and the mobile terminal 30b and the teleconference terminal 10b detect and authenticate each other in step S52. For example, when the user A1 brings the mobile terminal 30a-1 closer to the teleconference terminal 10a, the teleconference terminal 10a detects the mobile terminal 30a-1 via the short-distance wireless interface 16, receives identification information of the terminal, and performs authentication processing. When authentication is achieved, the teleconference terminal 10a reports to the mobile terminal 30a-1 identification information, the IP address, and the like of the teleconference terminal 10a. Accordingly, authentication processing is completed, and the mobile terminal 30a-1 enters a state in which the mobile terminal 30a-1 can communicate with the teleconference terminal 10a via short-distance wireless communication and via the LAN 100. Similar detection and authentication processing is performed between the mobile terminal 30b and the teleconference terminal 10b, and the mobile terminal 30b and the teleconference terminal 10b enter a state in which communication between the mobile terminal 30b and the teleconference terminal 10b can be performed.

Then, the user A1 operates the mobile terminal 30a-1, and requires the teleconference terminal 10a to transfer the communication session. Here, the mobile terminal 30a-1 reports, via the LAN 100 (or via short-distance wireless communication), to the teleconference terminal 10a setting information necessary for conversation over the IP telephone service, such as an IP address of the mobile terminal 30a-1 (step S53). If information necessary as setting information is reported to the teleconference terminal 10a in the processing of step S51, only a transfer request may be given without reporting such information in step S53. In addition, in practice, when a transfer request from the mobile terminal 30a-1 is given, the processing in steps S301 to S304 in FIG. 10 is performed, and then, setting information is reported from the mobile terminal 30a-1.

The teleconference terminal 10a reports to the teleconference terminal 10b the reported setting information using the session 1-1, which is pausing, and requires the teleconference terminal 10b to transfer the communication session, that is, to be connected to the mobile terminal 30a-1 over the IP telephone service (step S54). Connection to the teleconference terminal 10b is performed on the basis of a record of setting information stored in the teleconference terminal 10a. In addition, at that time, the connection controller 14 of the teleconference terminal 10a performs message transmission. Thus, the teleconference processing unit 11 is capable of continuing the teleconference processing with the teleconference terminal 10c.

In response to the transfer request received from the teleconference terminal 10a, the teleconference terminal 10b reports, via the LAN 100 (or via short-distance wireless communication), to the mobile terminal 30b the reported setting information, and requires the mobile terminal 30b to be connected to the mobile terminal 30a-1 (step S55). The mobile terminal 30b originates a call to the mobile terminal 30a-1 using the reported setting information, and establishes connection of the session 1-2 between the mobile terminals 30a-1 and 30b over the IP telephone service (step S56).

In contrast, in the example shown in FIG. 11B, the session 1-2 starts by transmission from the mobile terminal 30a-1. In steps S61 and S62, the mobile terminal 30a-1 and the teleconference terminal 10a detect and authenticate each other, and the mobile terminal 30b and the teleconference terminal 10b detect and authenticate each other, as in steps S51 and S52 shown in FIG. 11A. Then, when the user A1 operates the mobile terminal 30a-1 and requires the teleconference terminal 10a to transfer the communication session, the processing in steps S301 to S304 shown in FIG. 10 is performed. Then, the teleconference terminal 10a requires, using the session 1-1, the teleconference terminal 10b to send setting information for connection with the mobile terminal 30b, which is to be connected to the mobile terminal 30a-1 (step S63). The connection to the teleconference terminal 10b is performed on the basis of a record of setting information stored in the teleconference terminal 10a.

In response to the request from the teleconference terminal 10a, the teleconference terminal 10b accesses the mobile terminal 30b via the LAN 100 (or via short-distance wireless communication), requires the mobile terminal 30b to send setting information, and acquires the setting information (step S64). If information necessary as setting information is reported to the teleconference terminal 10b in the processing of step S62, the processing of step S64 may not be performed. Then, the teleconference terminal 10b reports to the teleconference terminal 10a the acquired setting information using the session 1-1 (step S65).

The teleconference terminal 10a reports, via the LAN 100 (or via short-distance wireless communication), to the mobile terminal 30a-1 the setting information received from the teleconference terminal 10*b*, and requires the mobile terminal 30*a*-1 to be connected to the mobile terminal 30*b* (step S66). In response to the connection request, the mobile terminal 30*a*-1 originates a call to the mobile terminal 30*b* using the reported setting information. Accordingly, connection based on the session 1-2 between the mobile terminals 30*a*-1 and 30*b* over the IP telephone service is established (step S67).

In accordance with the process described above, in response to the request from the mobile terminal 30*a*-1 to transfer the communication session, setting information, such as the address of the mobile terminal 30*a*-1 or the mobile terminal 30*b*, is automatically reported to a call originator of the new session 1-2, and the new communication session starts. Thus, the user A1 is able to start conversation with the user B1 by an easy operation without performing a setting operation for connection with the mobile terminal 30*b*, such as inputting of a telephone number and an IP address.

Although the communication session after transfer adopts the IP telephone service in the foregoing process, the communication session does not necessarily adopt the IP telephone service. Any communication service supported by a terminal used in a new session can be adopted.

As described above, according to the communication service in this embodiment, when a communication session is interrupted by another communication session, processing for recovering the original communication session or for transferring the original communication session to a newly established communication session while the interrupting communication session is maintained can be realized by an easy operation depending on the condition. Thus, the convenience of a user of a communication service, such as a teleconferencing service, can be enhanced.

It should be understood by those skilled in the art that various modifications, combinations, sub-combinations and alterations may occur depending on design requirements and other factors insofar as they are within the scope of the appended claims or the equivalents thereof.

What is claimed is:

1. A conference terminal for controlling connection with a partner conference terminal with which communication is performed via a predetermined communication service, comprising:
   setting information storage means for storing a record of setting information for the connection with the partner terminal with which the communication is performed;
   interruption processing means for temporarily stopping communication with a first user terminal in the process of the communication with the first user terminal and for starting communication with a second user terminal;
   recovery processing means for restarting the communication with the first user terminal on the basis of information stored in the setting information storage means when the interrupting communication with the second user terminal terminates;
   terminal detection means for detecting a third user terminal; and
   transfer processing means for starting communication between the third user terminal detected by the terminal detection means and a conference terminal designated by the second user terminal and disconnecting the communication with the first user terminal in the process of the interrupting communication with the user second terminal.

2. The conference terminal according to claim 1, further comprising:
   communication means for communicating with the third user terminal detected by the terminal detection means, wherein the transfer processing means includes setting information acquisition means for acquiring from the third user terminal via the communication means setting information for communicating with the third user terminal, and setting information reporting means for reporting to the second user terminal the setting information acquired by the setting information acquisition means and for requiring the second user terminal to establish connection between the conference terminal designated by the second user terminal and the third user terminal.

3. The conference terminal according to claim 2, wherein the communication means communicates with the third user terminal via a short-distance communication system, and wherein the terminal detection means detects the third user terminal by receiving access from the third terminal via the communication means.

4. The conference terminal according to claim 2, wherein the terminal detection means includes short-distance communication means for communicating with the third user terminal via a short-distance communication system, and authentication means for performing authentication processing for the third user terminal from which access is received via the short-distance communication means and for enabling the communication with the third user terminal via the communication means when the third user terminal is correctly authenticated.

5. The conference terminal according to claim 1, further comprising:
   communication means for communicating with the third user terminal detected by the terminal detection means, wherein the transfer processing means includes setting information acquisition means for acquiring from the second user terminal setting information for the communication between the conference terminal designated by the second user terminal and the third user terminal, and setting information reporting means for reporting to the third user terminal via the communication means the setting information acquired by the setting information acquisition means and for requiring the third user terminal to perform communication in accordance with the reported setting information.

6. The conference terminal according to claim 5, wherein the communication means communicates with the third user terminal via a short-distance communication system, and wherein the terminal detection means detects the third user terminal by receiving access from the third user terminal via the communication means.

7. The conference terminal according to claim 5, wherein the terminal detection means includes short-distance communication means for communicating with the third user terminal via a short-distance communication system, and authentication means for performing authentication processing for the third user terminal from which access is received via the short-distance communication means and for enabling the communication with the third user terminal via the communication means when the third user terminal is correctly authenticated.

8. The conference terminal according to claim 1, wherein, in order to start the interrupting communication with the second user terminal, the interruption processing means stops execution of an application program based on signals transmitted and received to and from the first user terminal, and regularly accesses the second user terminal after the interrupting communication starts.

9. A communication system comprising:

a first conference terminal that performs communication via a predetermined communication service; and a first user terminal that is capable of communicating with the first conference terminal via local communication means that is different from the communication service, wherein the first conference terminal includes setting information storage means for storing a record of setting information for connection with a partner conference terminal with which communication is performed via the communication service, interruption processing means for temporarily stopping communication with a second user terminal via the communication service in the process of the communication with the second user terminal and for starting communication with a third user terminal via the communication service, recovery processing means for restarting the communication with the second user terminal on the basis of information stored in the setting information storage means when the interrupting communication with the third user terminal terminates, terminal detection means for detecting the first user terminal, and transfer processing means for starting communication between the first user terminal detected by the terminal detection means and a second conference terminal designated by the third user terminal and disconnecting the communication with the second user terminal in the process of the interrupting communication with the third user terminal, and wherein the first user terminal includes access means for accessing the first conference terminal via the communication means so as to be detected by the terminal detection means, and communication control means for performing processing for starting the communication with the second conference terminal designated by the third user terminal in accordance with a communication start request from the transfer processing means.

10. A connection control method for controlling connection with a partner conference terminal with which communication is performed via a predetermined communication service, the method comprising the steps of:

storing, by setting information storage means, a record of setting information for the connection with the partner conference terminal with which the communication is performed;

temporarily stopping, by interruption processing means, communication with a first user terminal in the process of the communication with the first user terminal and starting communication with a second user terminal;

restarting, by recovery processing means, the communication with the first user terminal on the basis of information stored in the setting information storage means when the interrupting communication with the second user terminal terminates;

detecting, by terminal detection means, a third user terminal when the interrupting communication with the second user terminal is maintained; and starting, by transfer processing means, communication between the third user terminal detected by the terminal detection means and a conference terminal designated by the second user terminal and disconnecting the communication with the first user terminal.

11. A conference terminal for controlling connection with a partner conference terminal with which communication is performed via a predetermined communication service, comprising:

a setting information storage device to store a record of setting information for the connection with the partner conference terminal with which the communication is performed;

an interruption processing device to temporarily stop communication with a first user terminal in the process of the communication with the first user terminal and that starts communication with a second user terminal;

a recovery processing device to restart the communication with the first user terminal on the basis of information stored in the setting information storage unit when the interrupting communication with the second user terminal terminates;

a terminal detection device to detect a third user terminal; and a transfer processing device to start communication between the third user terminal detected by the terminal detection device and a conference terminal designated by the second user terminal and disconnects the communication with the first user terminal in the process of the interrupting communication with the second user terminal.

* * * * *